United States Patent [19]

Rym

[11] 3,896,368

[45] July 22, 1975

[54] VOLTAGE REGULATING DEVICE

[75] Inventor: Christian Rym, Nalinnes, Belgium

[73] Assignee: ACEC (Ateliers de Constructions Electriques de Charleroi), Charleroe, Belgium

[22] Filed: Oct. 19, 1973

[21] Appl. No.: 408,114

[30] Foreign Application Priority Data

| | | |
|---|---|---|
| Oct. 20, 1972 | Belgium | 4503 |
| Mar. 19, 1973 | Belgium | 4905 |
| Mar. 19, 1973 | Belgium | 4907 |

[52] U.S. Cl. .......... 323/8; 307/59; 323/15; 323/22 T; 323/25; 323/80

[51] Int. Cl. .......... B64g 1/30; G05f 1/46

[58] Field of Search .......... 307/59, 63; 323/8, 15, 323/16, 19, 22 T, 23, 25, 80

[56] References Cited

UNITED STATES PATENTS

| | | | |
|---|---|---|---|
| 3,480,789 | 11/1969 | Binckley et al. | 323/19 X |
| 3,600,599 | 8/1971 | Wright et al. | 307/53 |
| 3,766,402 | 10/1973 | Raamot | 323/80 X |

*Primary Examiner*—A. D. Pellinen
*Attorney, Agent, or Firm*—David A. Blumenthal; Arthur Schwartz; Raymond A. Robic

[57] ABSTRACT

Device for regulating the voltage of an electric energy source constituted of a group of solar cells gathered into modules. Each module have one terminal connected to a common conductor and an other terminal connected through a diode to a distribution conductor. The device comprises electronic interrupters connected between the common conductor and the terminal of a module connected to the diode, so as to short-circuit the module. A proportional shunt is connected between a point at the distribution conductor potential and the common conductor. A differential amplifier is provided between the distribution conductor and a reference voltage generating device. An analog-digital converter the input of which is connected to the output of the differential amplifier and a part of the outputs of which control the electronic interrupters, the remaining outputs controlling the proportional shunt.

8 Claims, 7 Drawing Figures

VOLTAGE REGULATING DEVICE

The present invention is particularly useful in artificial satellites placed in an orbit about earth or in any other space vehiles and concerns a device for regulating the voltage of an electric energy source feeding equipments, aboard which source is constituted of a group of solar cells gathered into modules. This gathering into modules is known and has gradually forced itself upon particularly because of the requirements of increasing power and reability and because this arrangement is easily adaptable to satellites in which the behaviour control stands following the three main axis of inertia, the modules being mounted onto a mechanically unfoldable structure which is properly oriented towards the sun.

It is known that a network of solar batteries constitutes a current source which is limited in voltage, the maximum intensity of which depends of several conditions such as the bearing of the network with regard to the sun, its temperature and the wear and tear of the solar batteries, thereby the necessity to provide a special device for regulating electrical characteristics.

Generally, the equipments on board of the satellite require a highly stable d.c. voltage and the regulating device must possess an extremely short response time.

During the last years, the power set up on board of satellites has continuously been increased and reaches at the present time one kilowatt; in some cases, it is even expected to use powers of about 7 kilowatts. However, when the consumed power gets over 200 to 300 watts, it is no more possible to use a single voltage regulator, in series or in parallel. This is due to the fact that, on the other hand, the d.c. regulators produce a very important emission of heat which is incompatible with the thermal conditions at the inside of the satellite and, on the other hand, the discriminators cause disturbing electromagnetic waves hard to filter and, moreover, the rapid switching transistors composing the latters are limited in voltage and in current.

The present invention brings a simple and reliable solution to the above-mentioned problem of the voltage regulation of solar batteries network; this solution may be extended to cases where the power required is very high.

Following a first embodiment of the invention, the voltage regulating device of an electric energy source constituted by a group of solar cells gathered into modules, each of these modules having one terminal connected to a common conductor and the other terminal connected through a diode to a distribution conductor, is characterized by electronic interrupters connected each between the common conductor and the terminal of a module connected to the diode, so as to short-circuit the module, by a proportional shunt connected between a point at the potential of the distribution conductor and the common conductor, by a differential amplifier connected between the distribution conductor and a reference voltage generating device, and by an analog-digital converter the analogic input of which is connected to the output of the differential amplifier and wherein a part of the binary outputs control the electronic interrupters while the other part of said outputs control the proportional shunt.

The above features and other features of the present invention will become clearer through the following description of preferred embodiments given with reference to the accompanying drawings, wherein.

The hereafter description refers to FIGS. 1 to 4 of the drawings and concerns a first embodiment of a regulating device according to the invention.

Figure 1:
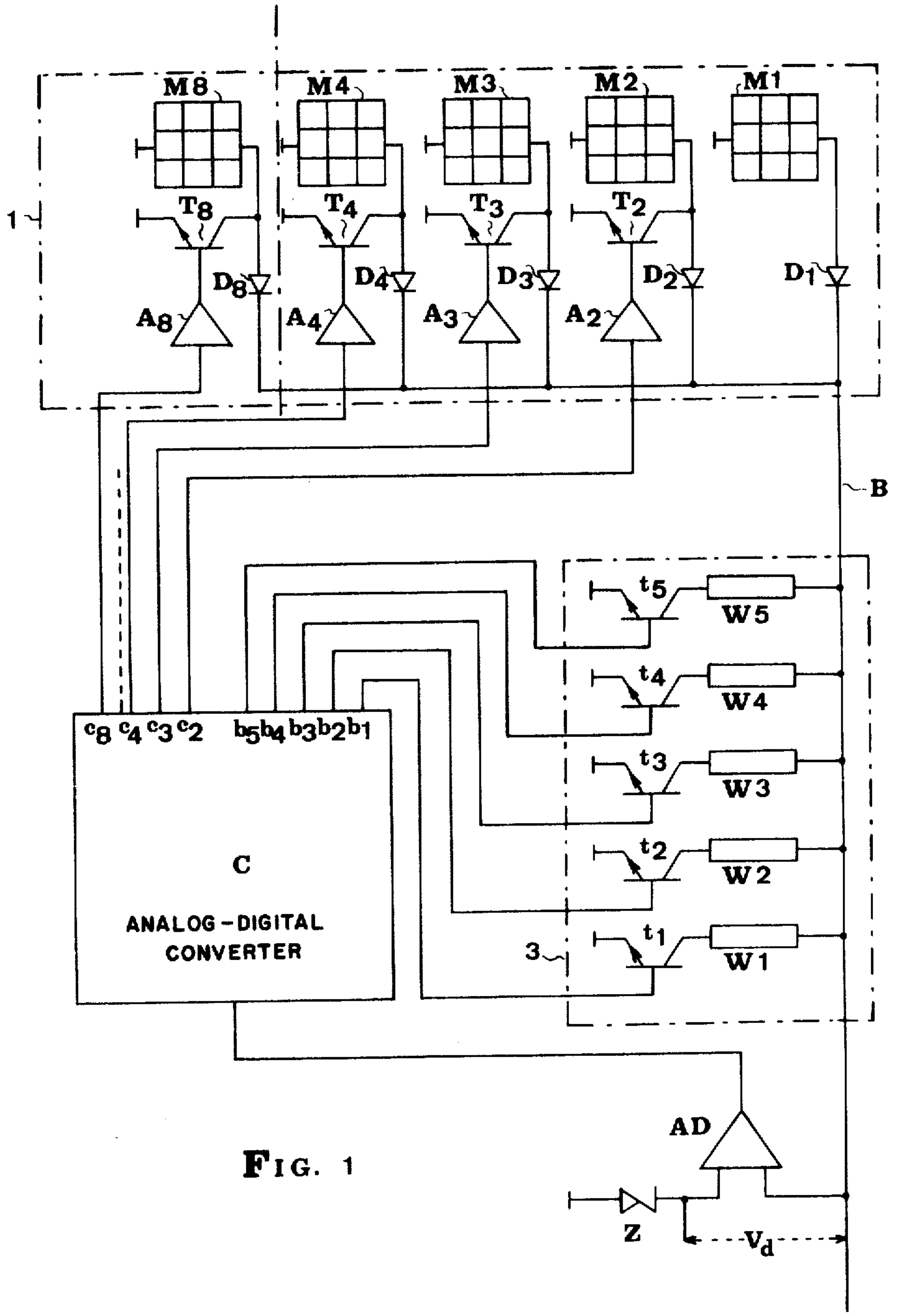
FIG. 1 illustrates one embodiment of a voltage regulating device in accordance with the present invention.

FIG. 1 illustrates a number of modules made of solar batteries $M_1$ to $M_8$ connected each by one of their terminals to a common conductor, such as ground, and by the other terminal through a diode $D_1$ to $D_8$ to a distribution conductor B feeding the apparatus aboard a satellite. These modules may be short-circuited by means of electronic interrupters such as transistors $T_2$ to $T_8$ which constitute a group realizing a coarse regulation of the voltage and indicated at 1. The fine regulation is obtained through a proportional shunt 3.

To control the coarse regulating circuit 1 and the fine regulating circuit 3, a differential amplifier AD is connected between the distribution conductor B and a reference voltage generating device, for instance a Zener diode Z. The output of the differential amplifier AD is connected to the input of an analog-digital converter C. The output terminals $C_2$ to $C_8$ of the converter C control by means of amplifiers $A_2$ to $A_8$ the opening and closure of the electronic interrupters $T_2$ to $T_8$, respectively.

Other outputs $b_1$ to $b_5$ of the converter C control the proportional shunt circuit 3. This shunt circuit is constituted of electronic interrupters $t_1$ to $t_5$ in series with load resistors having decreasing values, $W_1$ to $W_5$, respectively. The resistor-interrupter units are connected between ground and the distribution conductor B. It is to be noted that this control by a single converter C permits the coarse regulation and the fine regulation to occur simultaneously.

Figure 2:
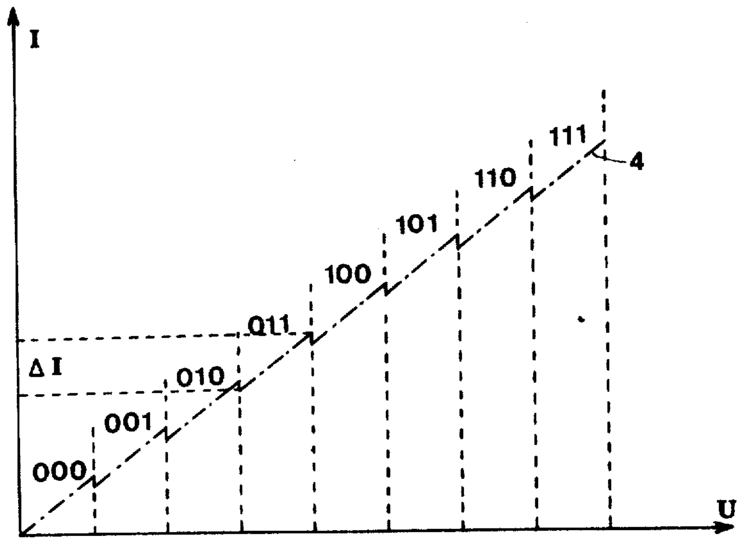
FIGS. 2, 3 and 4 show diagrams obtained from the device depicted in FIG. 1.

FIG. 2 is a diagram wherein a trace 4 shows the compensation characteristic. The sum of the currents I flowing through the electronic interrupters $T_2$ to $T_8$ is shown on the ordinate in relation with a compensation voltage U on the abscissa. This compensation characteristic permits to maintain continuously within tight limits the value of the voltage on the distribution conductor B. Point zero of error voltage $V_d$ (FIG. 1) moves along the curve 4 in relation to the sum of the currents I flowing through interrupters $T_2$ to $T_8$ and the shunt 3. The trace 4 is made up of a series of proportionally varying intervals, corresponding to variations of the current I flowing through the proportional shunt circuit 3. The proportional intervals are interconnected by sawtooth wave-forms. These wave-forms divide parts of trace 4 which belong to different combinations of the interrupters $T_2$ to $T_8$ short-circuited. These different combinations are designated by means of binary numbers of three bits and have the following signification; 001: $T_2$ is short-circuited; 010: $T_3$ and $T_4$ are short-circuited; 100: $T_5$, $T_6$, $T_7$ and $T_8$ are short-circuited. These sawtooth wave-forms mean that the shunt circuit 3 allows the flow of a maximum current ΔImax (FIG. 3) which is a little higher than the one susceptible to flow through the interrupters $T_2$ to $T_8$. Consequently, small variations of the shunt total current I may always be effectuated by means of the proportional shunt circuit 3.

Figure 3:
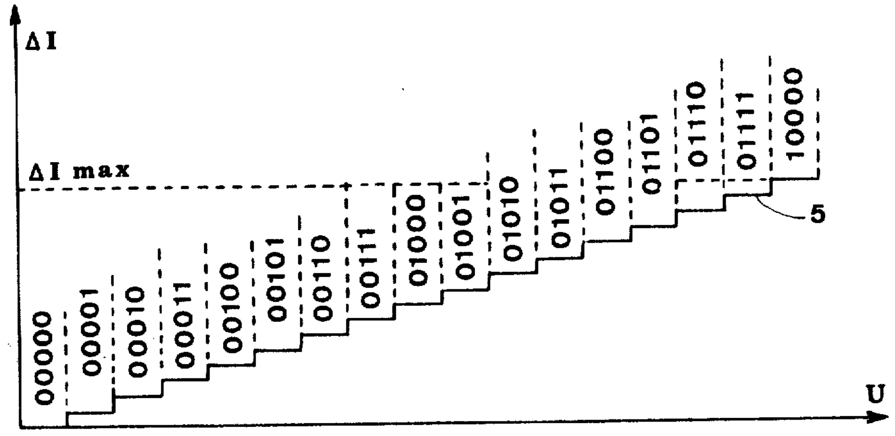
Figure 4:
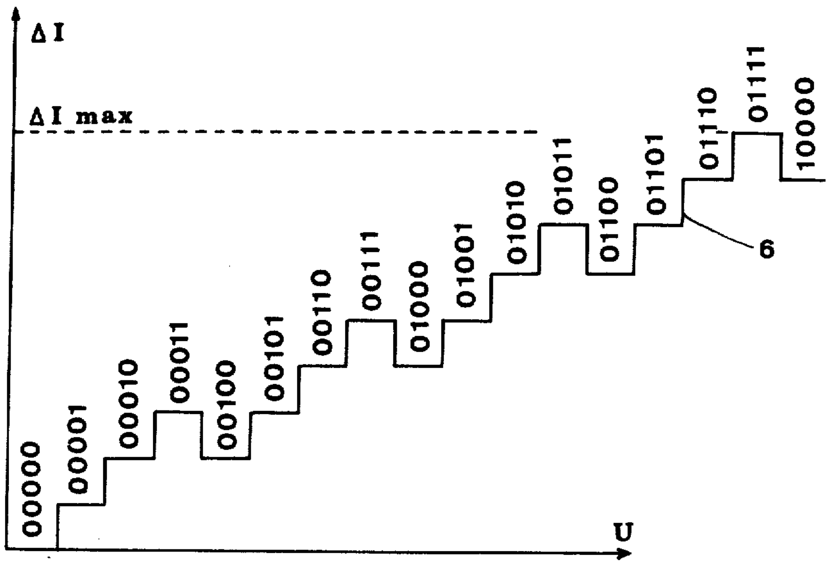

The FIG. 3 shows at a higher scale an interval of a proportional variation of the compensation characteristic following FIG. 2 for a proportional shunt circuit wherein resistors $W_1$ to $W_5$ have the following values: $W_1 = 16R$, $W_2 = 8R$, $W_3 = 4R$, $W_4 = 2R$ and $W_5 = R$. This compensation characteristic interval is shown by a staircase wave-shape 5. Each step or level of the staircase 5 represents a combination of electronic interrupters $t_1$ to $t_5$ short-circuited. This combination is marked above each step by a binary number of 5 bits. If the zero point of the error voltage $V_d$ is approximately located between two levels of the compensation characteristic, the regulation system oscillates between these two levels. This oscillation is normal and does not present any inconveniences, if, for example, the system oscillates between the levels 01110 and 01111 since, in this case, only the very weak current flowing through $W_1$ is switched on and off; and the direct voltage wave on conductor B does not go beyond admitted limits. If the system oscillates between the levels 01101 and 01110, the currents flowing through resistors $W_1$ and $W_2$ are switched on and off. The direct voltage wave in the conductor B is then still admissible even if the capacitance between the conductor B and the ground is relatively low. However, if the system oscillates between the levels 01111 and 10000, all the currents flowing through the resistors $W_1$ and $W_5$ are switched on and off at each oscillation. If the capacitance between the ground and the conductor B is very low, which is the case for a solar battery used in artificial satellites of the earth, the direct voltage wave or the noise thereof in the conductor B goes beyond the admitted limits.

According to the invention, this inconvenience is avoided by utilizing resistors W1 to W5, with, for example, the following proportional values: W1 = 8R, W2 = 4R, W3 = 4R, W4 = 2R, W5 = R. Generally, the values of the resistors $Wl$ to $Wn$ are equal to the terms of the geometrical series:

$$R\ (2^0, 2^1, 2^2, 2^3, \ldots, 2^{n-3}, 2^{n-3}, 2^{n-2})$$

$n$ being the number of resistors. Under these conditions, the curve 5 shown in FIG. 3 is modified and looks like curve 6 of FIG. 4. This curve 6 possesses the following characteristics: it is constituted of sequences of three rising steps and one falling step.

During the sequence of the three rising steps, only the two last bits of the binary numbers marked above each step are modified. This means that if the system oscillates at places of rising steps, the oscillation only affects the currents flowing through the resistors $W_1 = 8R$ and $W_2 = 4R$ so that the direct voltage wave in the conductor B does not go beyond the admitted limits. Conversely, at places of falling steps, the system cannot oscillate since a decrease of the shunt current due to an increase of the voltage on the conductor B leads to an even larger increase of the voltage on the conductor B or, inversely, an increase of the shunt current during a decrease of the voltage on the conductor B leads to an even heavier decrease of the voltage on the conductor B. Then, it is only sufficient to choose the steps of shunt 2 sufficiently small to bring the variations caused by the irregularities of the curve 6 to values which are smaller than admitted limits.

The converter C is commercially known. It comprises a buffer memory and works at the rate of an incorporated pilot clock. During a first period of each cycle of the clock, the converter carries out in function of the error voltage at its input the required corrections in the control of the electronic interrupters $T_2$ to $T_8$ and $t_1$ to $t_5$, the states of which are kept in the buffer memory. During the second period of the cycle of the clock (of a duration, for instance, of 50 μs), the converter transmits new commands.

The invention allows to maintain constant inside tight limits the output direct voltage of a battery of solar cells by means of extremely light devices, from which, in particular, heavy capacitors are included.

Following an improvement, the first embodiment of the invention is characterized in that the resistive shunt type regulator is replaced by a pulse duration discriminator connected to one or several parts of solar cells which are then specifically used for fine regulation.

The hereinafter description concerns a particular embodiment of a device according to this improvement.

If $n$ is the total number of bits at the output of the analog-digital converter, the k first bits being saved for the coarse regulation, the word of ($n$-$k$) bits is no longer decoded by means of resistors but transformed in relation with a pulse duty factor varying from 0 (all bits being equal to 0) to 1 (all bits being equal to 1) by steps, the total variation comprising $2^{n-k}$ steps.

A second embodiment of the invention concerns an improvement over the above-described arrangement with respect to the fine regulation which is realized in a purely analogic way.

According to the invention, the regulating device, which may be adapted to a group of solar cells gathered into modules, each of these being connected by one terminal to a ground and by the other terminal through a diode to a bus bar for feeding on board equipments, the regulating device comprising electronic interrupters connected each between the ground and the terminal of one or several modules connected to the diode, allowing to short-circuit the module, a differential amplifier connected between the bus bar and a reference voltage generator, and an analog-digital converter the analogic input of which is connected to the output of the differential amplifier and the binary outputs of which control the electronic interrupters. The regulating device is characterized in that the binary outputs of the A/D converter are connected to a digital-analog converter, the analogic output of which together with that of the differential amplifier are fed to a difference detector outputing a signal which controls a regulator acting on one or more parts of a resistive shunt connected between the bus bar and the ground and adapted to the fine regulation.

Figure 5:
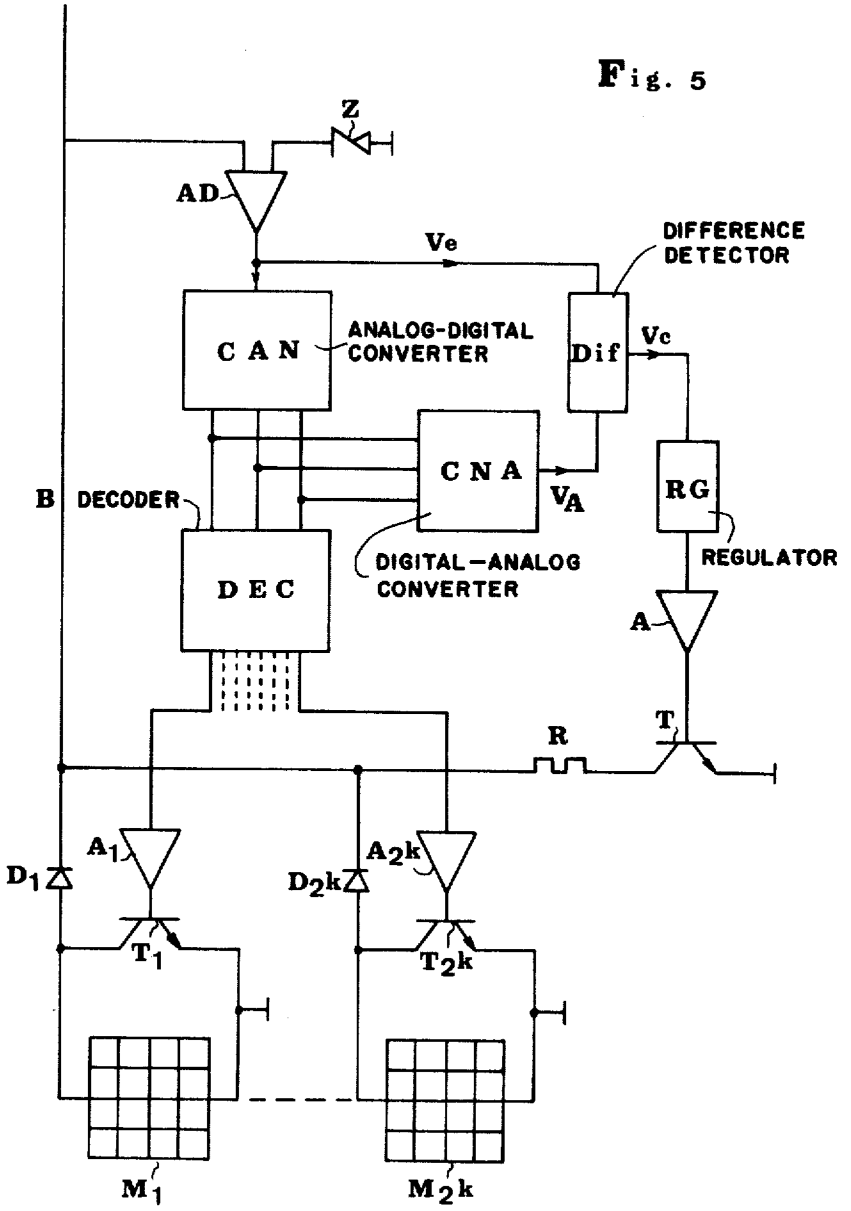
FIG. 5 illustrates another arrangement of a voltage regulating device in accordance with the present invention.
Figure 6:
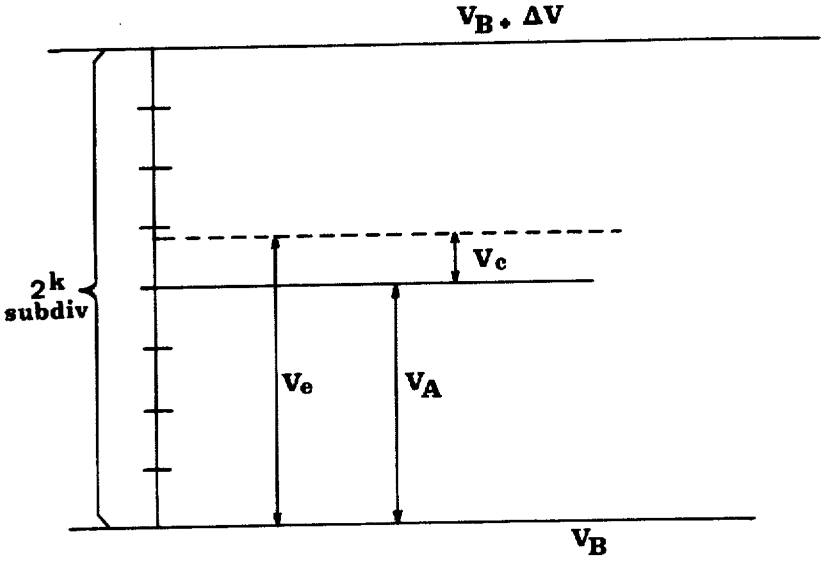
FIG. 6 is a voltage chart for illustrating the operation of the device of FIG. 5.
Figure 7:
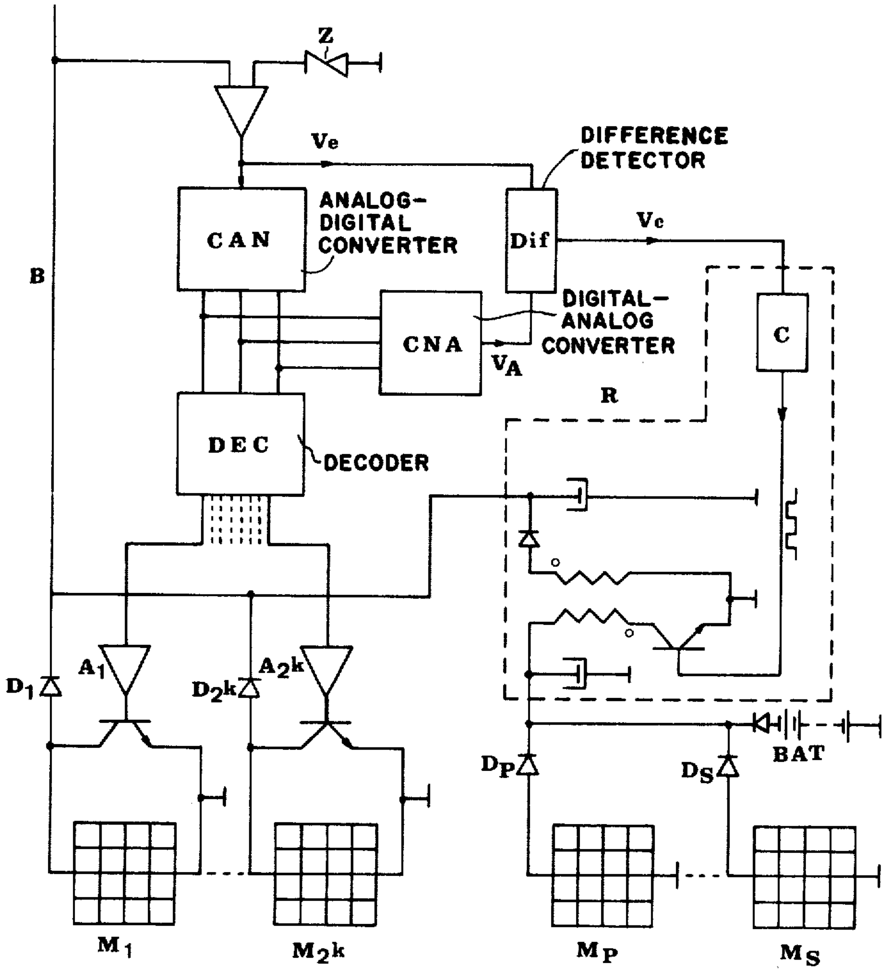
FIG. 7 is yet another embodiment of the invention utilizing a pulse width regulator.

The hereafter description refers to the arrangements shown on FIGS. 5 to 7 of the drawings and concerns particular arrangements of a regulating device according to a second embodiment of the invention.

FIG. 5 illustrates a number $2^k$ of modules $M_1 \ldots M_{2k}$ each of which has a terminal connected to ground and another terminal connected to the bus bar B through respective diodes $D_1 \ldots D_{2k}$. These modules may be short-circuited by electronic interrupters which are, for instance, respective transistors $T_1 \ldots T_2k$ controlled by amplifiers $A_1 \ldots A_2k$. These amplifiers are themselves controlled by a decoder DEC which receives from an analog-digital converter CAN a certain number $k$ of bits for the coarse regulation. The input of the converter CAN is connected to the output of a differential amplifier AD which receives at the input the voltage to be regulated, from the bus bar B, and a reference voltage supplied, as shown, by a Zener diode Z. The analog-digital converter output is connected to the input of a digital-analog converter CNA the analogic output of which, having a voltage $V_A$, and the output of the error amplifier AD, having a voltage $V_e$, are applied to a different detector DIF. The output of the detector, having a voltage $V_c$, is sent to a regulator RG which controls one or several sections of the resistive analogic shunt for the fine regulation. These sections are constituted of a resistor R in series with the transistor I controlled by an amplifier A.

A voltage solely corresponding to the value necessary for the coarse regulation is therefore provided at the output of the converter CNA. Now, the initial information from the amplifier AD is inclusive; consequently, by taking the difference between these two values, there is obtained a voltage corresponding exactly to the value necessary for the fine regulation. As this voltage is continuously variable, this voltage is therefore analogic and may be used to control any standard regulator in series, in shunt or a discriminator.

FIG. 6 illustrates the various voltage obtained from the operation of the device shown in FIG. 5. Voltage $V_B$ is the nominal voltage of the bus bar, $\Delta V$ is the difference voltage, which could be 0.5, 1, 2 percent . . . ; $V_e$ is the total error voltage at the output of the amplifier AD at a given time, $V_A$ is the voltage at the output of the digital-analog converter CNA, the latter voltage corresponding to the first bits of the analog-digital conversion, that is to an integer number of numerical sections of coarse regulation; $V_c$ is the analogic voltage which controls the fine regulation, constituted of the difference between the error voltage $V_e$ and the voltage $V_A$.

FIG. 7 illustrates an alternate arrangement of the regulating device according to the second embodiment of the invention, wherein there is provided a pulse duration discriminator which is used as a battery discharge regulator when such a battery is used on board of a satellite and useful in case of eclipse. This discriminator is used for the fine regulation. This permits to earn the use of a regulator which would be solely useful in sunny period with the supplementary advantage of maintaining the heat emission perfectly constant regardless of the state of the load.

In FIG. 7, the same elements as in FIG. 5 are indicated by the same reference numbers.

The arrangement comprises $2^k$ numerical sections of modules used for the coarse regulation while the fine regulation is realized by one or several modules $M_p \ldots M_s$ associated to the regulator R of the battery BAT of the satellite, controlled from the voltage $V_c$ through a control circuit C.

I claim:

1. A device for regulating the voltage of an energy source constituted of a plurality of solar cells grouped into modules, each module having one terminal connected to a common conductor and another terminal connected through a diode to a distribution conductor, said device comprising:
   - an electronic interrupter connected to the common conductor and the diode connected terminal of each module so as to short-circuit the module;
   - a proportional shunt connected between the distribution conductor and the common conductor;
   - a differential amplifier connected between said distribution conductor and a reference voltage generating device; and
   - an analog-digital converter the input of which is connected to the output of said differential amplifier and a part of the binary outputs of which control said electronic interrupters, the remaining binary outputs controlling said proportional shunt.

2. Device as claimed in claim 1, characterized in that said proportional shunt is constituted of a group of dissapating circuits in parallel each circuit being constituted of a shunt electronic interrupter controlled by one binary output of said converter and of a resistor serially connected to said shunt interrupter.

3. A device as recited in claim 2, characterized in that the values of the resistors serially connected to the shunt electronic interrupters are equal to the terms of the geometrical series:

$$R\ (2^0, 2^1, 2^2, 2^3, \ldots, 2^{n-3}, 2^{n-3}, 2^{n-2})$$

$n$ being the number of resistors.

4. A device for regulating the voltage of an electric energy source comprising a plurality of solar cells grouped into modules, each module having one terminal connected to a common conductor and another terminal connected through a diode to a distribution conductor, said device comprising:
   - an electronic interrupter connected to the common conductor and the diode connected terminal of each module so as to short-circuit the module;
   - a pulse width modulation regulator connected between the distribution conductor and the common conductor;
   - a differential amplifier connected between said distribution conductor and a reference voltage generating device; and
   - an analog-digital converter the input of which is connected to the output of said differential amplifier and a part of the outputs of which control said electronic interrupters, the remaining outputs controlling said pulse width modulation regulator.

5. A regulating device for a first plurality of solar cells grouped into modules, each of said modules having one terminal connected to a common conductor and another terminal connected through a diode to a distribution conductor, said device comprising;
   - an electronic interrupter connected between the common conductor and the diode connected terminal of each of said modules so as to short-circuit said modules,
   - a proportional shunt connected between the distribution conductor and the common conductor,
   - a differential amplifier connected between said distribution conductor and a reference voltage generator,
   - an analog-digital converter having an input connected to the output of said differential amplifier and having a plurality of binary outputs, said outputs connected for controlling said electronic interrupters, a digital-analog converter connected to receive said binary outputs from said analog-digital converter, said digital-analog converter having an analog output, a difference circuit connected to receive said analog output from said digital-analog converter and the output of said differential amplifier, said difference circuit having an output connected for controlling said proportional shunt.

6. A device as recited in claim 5 further comprising an analog regulator connected to receive the output of said difference circuit for controlling said proportional shunt.

7. A device as recited in claim 5 further comprising a second plurality of solar cells grouped into modules and connected to said distribution conductor for fine regulation thereof.

8. A regulating device for a first plurality of solar cells grouped into modules, each of said modules having one terminal connected to a common conductor and another terminal connected through a diode to a distribution conductor, said device comprising:

an electronic interrupter connected between the common conductor and the diode connected terminal of each of said modules so as to short-circuit said modules, a pulse width modulation regulator connected between the distribution conductor and the common conductor, a differential amplifier connected between said distribution conductor and a reference voltage generator, an analog-digital converter having an input connected to the output of said differential amplifier and having a plurality of binary outputs, said outputs connected for controlling said electronic interrupters, a digital-analog converter connected to receive said binary outputs from said analog-digital converter, said digital-analog converter having an analog output, a difference circuit connected to receive said analog output from said digital-analog converter and the output of said differential amplifier, said difference circuit having an output connected for controlling said pulse width modulation regulator.

* * * * *